United States Patent
Van Gorkum et al.

(10) Patent No.: US 12,466,976 B2
(45) Date of Patent: Nov. 11, 2025

(54) TWO-COMPONENT SOLVENT-BASED COATING COMPOSITION

(71) Applicant: Akzo Nobel Coatings International B.V., Amsterdam (NL)

(72) Inventors: Remy Van Gorkum, Amsterdam (NL); Niels Aalfons Gerhard Bosch, Amsterdam (NL); Michel Daniel Meijer, Amsterdam (NL); Rudolphus Arnoldus Cornelis Vertegaal, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 764 days.

(21) Appl. No.: 17/782,710

(22) PCT Filed: Dec. 7, 2020

(86) PCT No.: PCT/EP2020/084848
§ 371 (c)(1),
(2) Date: Jun. 6, 2022

(87) PCT Pub. No.: WO2021/116006
PCT Pub. Date: Jun. 17, 2021

(65) Prior Publication Data
US 2023/0053381 A1 Feb. 23, 2023

(30) Foreign Application Priority Data
Dec. 10, 2019 (EP) ..................... 19214856

(51) Int. Cl.
C09D 167/08 (2006.01)
C09D 7/20 (2018.01)
C09F 9/00 (2006.01)

(52) U.S. Cl.
CPC ............ *C09D 167/08* (2013.01); *C09D 7/20* (2018.01); *C09F 9/00* (2013.01)

(58) Field of Classification Search
CPC ............ C09D 167/08; C09D 7/20; C09F 9/00
See application file for complete search history.

(56) References Cited

U.S. PATENT DOCUMENTS

| 3,558,387 A | 1/1971 | Bassemir et al. |
| 4,014,830 A | 3/1977 | Rumfield |
| 4,224,202 A | 9/1980 | Heiberger |
| 4,225,473 A | 9/1980 | Heiberger |
| 4,571,420 A * | 2/1986 | Marks ............... C08G 75/045 525/344 |
| 4,983,716 A | 1/1991 | Rao et al. |
| 5,039,740 A | 8/1991 | Anderson et al. |
| 6,476,183 B2 * | 11/2002 | Bakkeren ............ C09D 181/00 428/419 |
| 2015/0126639 A1 * | 5/2015 | Roller .................. C09D 167/08 522/111 |

FOREIGN PATENT DOCUMENTS

| DE | 3803141 A1 | 8/1989 |
| EP | 0492847 A2 | 7/1992 |
| GB | 2294938 A | 5/1996 |
| WO | WO00/29495 A1 | 5/2000 |
| WO | WO/01/46294 A1 | 6/2001 |
| WO | WO2012/079624 A1 | 6/2012 |
| WO | WO2012/093250 A1 | 7/2012 |

OTHER PUBLICATIONS

English Translation of DE3803141A1.
Klaasen et al., Fast Drying Cobalt-Free High Solids Alkyd Paints, Progress in Organic Coatings, Elsevier B.V. NL, vol. 55, No. 2, Feb. 1, 2006, pp. 149-153.
Search Report of Corresponding Application No. EP 19214856.7, dated Jun. 19, 2020.
Search Report and Written Opinion of Corresponding International Application No. PCT/EP2020/084848, mailed Mar. 1, 2021.
International Preliminary Report on Patentability of Corresponding International Application No. PCT/EP2020/084848, dated Dec. 13, 2021.

* cited by examiner

*Primary Examiner* — Robert S Jones, Jr.
*Assistant Examiner* — Joshua Caleb Bledsoe
(74) *Attorney, Agent, or Firm* — Pauly, DeVries Smith & Deffner LLC

(57) ABSTRACT

A two-component solvent-based coating composition comprising a component A comprising an autoxidizable resin comprising unsaturated fatty acids and a metal-ligand complex as drying catalyst, wherein the metal is manganese, vanadium or iron; and a component B comprising a (meth)acrylate compound and a thiol compound, wherein the (meth)acrylate compound is a poly (meth)acryloyl functional ester of (meth)acrylic acid and a polyhydric alcohol or a poly (meth)acryloyl functional dimer of such ester, wherein component B is free of drying catalyst, wherein component A is free of a compound comprising a thiol group and of a compound comprising a (meth)acryloyl functional group, and wherein the coating composition is free of cobalt.

14 Claims, No Drawings

TWO-COMPONENT SOLVENT-BASED COATING COMPOSITION

CROSS-REFERENCE TO RELATED APPLICATIONS

This application is a 35 U.S.C. § 371 national phase application of PCT Application No. PCT/EP2020/084848 (published as WO 2021/116006 A1), filed on Dec. 7, 2020, which claims the benefit EP Application Serial No. 19214856.7, filed on Dec. 10, 2019, of which is incorporated herein by reference in its entirety.

FIELD OF THE INVENTION

The present invention relates to a two-component solvent-based coating composition and to a substrate coated with a coating deposited from such coating composition.

BACKGROUND OF THE INVENTION

Two-component solvent-based coating compositions that result in very hard scratch resistant coatings are known in the art. Such coatings are typically based on isocyanate curing technology. Such coating compositions comprise a resin component comprising a binder polymer with isocyanate-reactive functionality, such as an OH-functional polyester or alkyd, and a curing component comprising an isocyanate-functional curing agent, typically a di-isocyanate.

Isocyanate-functional curing agents are, however, toxic and form a health hazard to the user. Therefore, there is a demand for isocyanate-free coating compositions that can provide similar coating properties.

Coating compositions based on alkyd resin or other autoxidizable resins typically result in coatings that are not as hard or scratch-resistant as isocyanate crosslinked coatings. In order to increase the hardness of alkyd-based coatings, alkyd resins have been blended with compounds that have acryloyl or methacryloyl functionality.

For example, in U.S. Pat. No. 4,014,830 a coating composition comprising an alkyd resin blended with 1 to 10 wt % based on the total weight of the blend of a polyacrylate or polymethacrylate ester of a polyol is disclosed.

In WO 01/46294 is disclosed a one-component coating composition comprising an alkyd resin, a siccative, and a polythiol as crosslinker. The equivalence ratio of SH-functional groups to unsaturated carbon-carbon bonds is less than 0.3; between 0.04 and 0.12 in the examples.

In WO 02/46294, polythiol is added to the alkyd resin to improve curing at low temperatures compared to conventional alkyd coating compositions.

The addition of a thiol compound to an alkyd resin with a siccative has, however, been found to result in limited storage stability and in an undesired sulfide odor.

None of the alkyd-based coating compositions disclosed in the prior art result in a coating with a hardness comparable to isocyanate cured coating compositions.

There is a need for improved hard, scratch-resistant coatings without isocyanate curing.

SUMMARY OF THE INVENTION

It has now been found that isocyanate-free, hard, scratch-resistant coatings can be obtained from a two-component solvent-based coating composition that has a component A comprising an autoxidizable resin with unsaturated fatty acids and a metal-ligand complex as drying catalyst and a component B comprising a (meth)acrylate compound with poly(meth)acryloyl functionality and a thiol compound.

Accordingly, the invention provides in a first aspect a two-component solvent-based coating composition comprising:

A a component comprising an autoxidizable resin comprising unsaturated fatty acids and a metal-ligand complex as drying catalyst, wherein the metal is manganese, vanadium or iron; and B a component comprising a (meth)acrylate compound and a thiol compound, wherein the (meth)acrylate compound is a poly (meth)acryloyl functional ester of (meth)acrylic acid and a polyhydric alcohol or a poly (meth)acryloyl functional dimer of such ester, wherein component B is free of drying catalyst, wherein component A is free of a compound comprising a thiol group and of a compound comprising a (meth)acryloyl functional group, and wherein the coating composition is free of cobalt.

The coating composition according to the invention has been found to result in very hard, scratch-resistant coatings that are tack-free soon after application.

Moreover, each of components A and B have been found to be storage stable and, upon mixing the two components, the coating composition has an acceptable pot life. A further advantage of the coating composition according to the invention is that it can be formulated such that it does not have the unpleasant odor that is typical for hydrogen sulfide.

In a second aspect, the invention provides a substrate coated with a coating deposited from a coating composition according to the first aspect of the invention.

DETAILED DESCRIPTION OF THE INVENTION

The coating composition according to the invention is a two-component solvent-based coating composition. It comprises a component A and a component B. The individual components A and B are manufactured and stored separately and are combined shortly before use to obtain the coating composition. The pot life (the time during which a coating composition can be applied at a temperature in the range of from 15 to 25° C. without the viscosity increasing as a result of crosslinking reactions to an extent that application is no longer possible), depends on the constituents used, in particular the autoxidizable resin, drying catalyst, (meth)acrylate compound, and thiol compound. Preferably, the pot life of the coating composition is in the range of from 30 minutes to 240 minutes, more preferably of from 60 minutes to 120 minutes.

Component A comprises an autoxidizable resin comprising unsaturated fatty acids. Autoxidizable resins with unsaturated fatty acids are resins that form a film through evaporation of the liquid carrier (organic solvent and/or water) followed by hardening of the resin via radical autoxidation reactions. The latter is known as chemical or oxidative drying. The unsaturated carbon-carbon bonds in the fatty acids react with oxygen from the atmosphere to form hydroperoxides which subsequently decompose to form free radicals. Recombination of these free radicals causes covalent bonds to be formed between the polymer chains. In this way, a liquid coating composition that comprises autoxidizable resin hardens to form a solid cured coating. This process is also referred to as autoxidation or oxidative drying.

The autoxidizable resin in component A may be any suitable autoxidizable resin comprising unsaturated fatty acids, for example a polyacrylate modified with unsaturated fatty acids or an alkyd resin, preferably an alkyd resin.

Preferably, the autoxidizable resin comprises unsaturated fatty acids with 12 to 22 carbon atoms, more preferably unsaturated fatty acids with two or more unsaturated carbon-carbon bonds and 12 to 22 carbon atoms. Examples of suitable unsaturated fatty acids include oleic acid, ricinoleic acid, linoleic acid, linolenic acid, and eleostearic acid. Fatty acids derived from linseed oil, sunflower oil, soybean oil, tung oil, or canola oil are particularly suitable. Preferably the fatty acids comprised in the autoxidizable resin have an iodine value in the range of from 120 to 180, more preferably of from 135 to 180. Iodine value is defined as the mass of iodine in grams that is consumed by 100 grams of fatty acid. Reference herein to iodine value is to iodine value as determined according to ISO 3961.

In a preferred embodiment, the autoxidizable resin is an alkyd resin.

The alkyd resin may be any suitable alkyd resin. Suitable alkyd resins are known in the art and obtainable by reaction of a polyhydric alcohol, a polybasic acid and an unsaturated oil or fatty acid.

Examples of suitable dihydric alcohols include ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than three hydroxyl groups are pentaerythritol, sorbitol, and etherification products of the compounds in question, such as ditrimethylol propane and di-, tri-, and tetrapentaerythritol.

Examples of suitable polybasic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetra-carboxylic acid, endoisopropylidene-cyclohexane-1,2-dicarboxylic acid, cyclo-hexane-1,2,4,5-tetracarboxylic acid, and butane-1,2,3,4-tetracarboxylic acid. If so desired, the carboxylic acids in question may be used as anhydrides or in the form of an ester, preferably an ester of an alcohol having one to four carbon atoms.

The alkyd resin preferably is an alkyd resin with a short oil length, more preferably an oil length in the range of from 20 to 40%, even more preferably of from 25 to 38%. Reference herein to oil length is to the weight of fatty acids based on the total solids weight of the alkyd resin.

The number average molecular weight of the alkyd resin is preferably in the range of from 1,000 to 5,000 g/mol, more preferably of from 1,500 to 3,500 g/mol, even more preferably of from 2,000 to 3,000 g/mol. The weight average molecular weight of the alkyd resin is preferably in the range of from 5,000 to 50,000 g/mol, more preferably of from 10,000 to 30,000 g/mol, even more preferably of from 12,000 to 20,000 g/mol. In a particularly preferred embodiment, the number average molecular weight of the alkyd resin is in the range of from 1,500 to 3,500 g/mol and the weight average molecular weight in the range of from 10,000 to 30,000 g/mol. Reference herein to weight average molecular weight and to number average molecular weight is to the weight average molecular weight and to the number average molecular weight as determined by gel permeation chromatography (GPC) using polystyrene standards in accordance with ISO 16014-1.

The drying catalyst in component A is a metal-ligand complex, wherein the metal is manganese, vanadium or iron. Manganese-, vanadium-, and iron-ligand complexes are known in the art as primary driers for autoxidizable resins such as alkyd resins. Any suitable manganese-, vanadium-, or iron-ligand complex may be used, for example vanadyl bis(acetyl acetonate) or a complex of iron or manganese and a nitrogen donor ligand. Preferably, the drying catalyst is an iron-ligand complex or a manganese-ligand complex, since it has been found that coating compositions with an iron-ligand complex or a manganese-ligand complex have a better pot life than coating compositions with vanadium-ligand complex as drying catalyst.

Suitable complexes of iron or manganese and a nitrogen donor ligand are for example disclosed in WO 2012/079624 and in WO 2012/093250. Suitable iron-ligand complexes include complexes of iron and a bispidine ligand, in particular an iron-bispidon complex. More preferably, the drying catalyst is a manganese-ligand complex, even more preferably a manganese-1,4,7-trialkyl-1,4,7-triazacyclononane complex. A manganese-1,4,7-trimethyl-1,4,7-triazacyclononane complex is particularly preferred.

The metal and the ligand may be separately added to component A to form a metal-ligand complex in-situ. If the metal-ligand complex is for example a manganese-1,4,7-trimethyl-1,4,7-triazacyclononane complex, manganese may be added as a manganese carboxylate salt and the ligand may be added as such. A manganese-1,4,7-trimethyl-1,4,7-triazacyclononane complex is then formed in component A, in the same way as has been described in WO 2013/092441.

The coating composition is free of cobalt and the resin component is thus free of a cobalt-based drying catalyst. It has been found that the presence of cobalt in a coating composition comprising in combination autoxidizable resin, (meth)acrylate compound and thiol compound as herein defined, results in a reddish discoloration of the coating composition upon mixing of the component comprising the cobalt with the component comprising the thiol compound.

Component A may further comprise coordination driers and/or secondary driers. Coordination driers, also referred to as through driers, promote film-forming by interaction with carboxyl and hydroxyl groups in the polymeric binder. Thus, coordination driers can bridge two or more polymer chains. Such carboxyl and hydroxyl groups may be initially present in the alkyd resin or may be formed during the drying process. Coordination driers comprise metal driers based on zirconium (Zr), strontium (Sr), aluminum (Al), bismuth (Bi), lanthanum (La), neodymium (Nd), lead (Pb), or barium (Ba). Secondary driers, also referred to as auxiliary driers, are metal-based compounds that exist in a single oxidation state and are not catalytically active by themselves. Secondary driers affect the drying rate by interacting with primary driers. Secondary driers include calcium (Ca), zinc (Zn), potassium (K) and lithium (Li) metal soaps.

Component A preferably comprises an anti-skinning agent. Anti-skinning agents are known in the art and include phenols, hydroquinones, hydroxylamines, in particular N,N-dialkylhydroxylamines, and oximes.

Component B comprises a (meth)acrylate compound and a thiol compound. The (meth)acrylate compound and the thiol compound preferably are different compounds, wherein the (meth)acrylate compound is free of thiol functional groups and the thiol compound is free of (meth)acryloyl functional groups.

The (meth)acrylate compound is a poly (meth)acryloyl functional ester of acrylic acid or methacrylic acid and a polyhydric alcohol or a poly (meth)acryloyl functional dimer of such ester. Such compounds have a relatively low molecular weight and have two or more polymerizable (meth)acryloyl functional groups, preferably two to four polymerizable (meth)acryloyl functional groups. The compound thus preferably is a di-, tri-, or tetra-(meth)acryloyl functional compound. Preferably, the (meth)acrylate compound has a molecular weight in the range of from 180 to 500 g/mol, more preferably of from 200 to 400 g/mol.

Examples of suitable (meth)acrylate compounds include trimethylolethane triacrylate, trimethylolpropane triacrylate, trimethylolethane trimethacrylate, trimethylolpropane trimethacrylate, tetramethyleneglycol dimethacrylate, triethylene glycol dimethacrylate, tetraethylene glycol diacrylate, tetraethylene glycol dimethacrylate, neopentyl glycol dimethacrylate, 1,3-propanedioldimethacrylate, 1,4-butanedioldimethacrylate, pentaerythritol trimethacrylate, pentaerythritol tetramethacrylate, and di(trimethylolpropane) tetraacrylate.

Preferably, the (meth)acrylate compound is a methacrylate compound, i.e. an ester of methacrylic acid and a polyhydric alcohol. It has been found that the storage stability of component B with a methacrylate compound is better than with a comparable acrylate compound. Preferred methacrylate compounds are trimethylolpropane trimethacrylate, trimethylolethane trimethacrylate, neopentyl glycol dimethacrylate, and pentaerythritol tetramethacrylate, more preferably trimethylolpropane trimethacrylate.

The thiol compound may be a mono-functional, di-functional or poly-functional thiol compound. The thiol compound preferably has a molecular weight in the range of from 100 to 10,000 g/mol, more preferably of from 120 to 5,000 g/mol, even more preferably of from 130 to 1,000 g/mol. Preferably, the thiol compound is an alkanethiol with at least 6 carbon atoms, in particular in the range of from 10 to 20 carbon atoms, or an ester of thioglycolic acid, 2-mercapto propionic acid or 3-mercapto propionic acid with an alcohol or a polyol such as glycol, pentaerythritol, dipentaerythritol, or trimethylolpropane. More preferred thiol compounds are selected from the group consisting of 1-undecanethiol, 1-dodecanethiol, 1-hexadecanethiol, 1-octadecanethiol, 1-nonadecanethiol, ethylene glycol bis(thioglycolate), ethylene glycol bis(2-mercaptopropionate), ethylene glycol bis(3-mercaptopropionate), trimethylolpropane tris (2-mercaptopropionate), trimethylolpropane tris(3-mercaptopropionate), pentaerythritol tetrakis(thioglycolate), pentaerythritol tetrakis(2-mercaptopropionate), pentaerythritol tetrakis(3-mercaptopropionate), and mixtures of two or more thereof. Particularly preferred thiol compounds are tri- or tetra functional thiol compounds, more in particular trimethylolpropane tris(3-mercaptopropionate) or pentaerythritol tetrakis(3-mercapto propionate).

The molar ratio of thiol groups in the thiol compound to ethylenically unsaturated groups in the (meth)acrylate compound preferably is in the range of from 0.01 to 0.10, more preferably of from 0.04 to 0.06. It has been found that the time before an applied coating becomes tack-free increases at higher ratios. Also, film properties have found to deteriorate at a higher ratio. If the ratio is very low, typically below 0.01, tack-free times undesirably increase.

All of the thiol compound and all of the (meth)acrylate compound in the coating composition is in component B. Component A is thus free of the thiol compound and free of the (meth)acrylate compound. Component A is free of any compound with a thiol group or with a (meth)acryloyl functional group. Component B is free of any drying catalyst. Thus, the combined presence of a thiol compound or a (meth)acrylate compound and a drying catalyst in a single component is avoided. It has been found that this results in very good storage stability of the coating composition.

The coating composition (components A and B together) preferably comprises in the range of from 20 to 40 wt % of the autoxidizable resin comprising unsaturated fatty acids as specified hereinabove. At least part of the autoxidizable resin comprising unsaturated fatty acids in the coating composition is in component A. Part of the autoxidizable resin may be in component B. Preferably at least 50 wt % of the autoxidizable resin is in component A, more preferably at least 80 wt %, even more preferably all of the autoxidizable resin is in component A. Preferably, the coating composition is free of any binder resin other than the autoxidizable resin with unsaturated fatty acids.

The amounts of the autoxidizable resin and the (meth)acrylate compound are preferably such that if the two components are combined to form the coating composition, the coating composition comprises in the range of 15 to 40 wt % of (meth)acrylate compound based on the total weight of the autoxidizable resin and the (meth)acrylate compound.

The composition is a solvent-based composition. The autoxidizable resin in component A is dissolved in organic solvent. Component B may be solvent-free or comprise an organic solvent to obtain a desired viscosity. Preferably, both components comprise organic solvent. The total coating composition, i.e. after combining components A and B preferably has a content of organic solvent in the range of from 25 to 45 wt %, more preferably of from 30 to 42 wt %.

Any suitable organic solvent may be used. Suitable organic solvents are known in the art and include aromatic hydrocarbon solvents such as toluene and xylene, aliphatic hydrocarbon solvents such as linear and branched alkanes comprising 6 to 10 carbon atoms, and oxygenated organic solvents such as for example an alcohol, glycol ether, glycol ester, alkyl acetate, ketone, ester, and glycol ether/ester. Oxygenated organic solvents are preferred.

The composition may comprise some water, preferably less than 10 wt %, more preferably less than 5 wt %. Typically, the coating composition will comprise in the range of from 0.5 to 3 wt % water.

The coating composition preferably has a solids content in the range of from 55 to 75 wt %, more preferably of from 58 to 70 wt %. Reference herein to solids content is to solids content as determined in accordance with ISO 3251 with an initial sample mass of 1.0 g, test duration of 60 minutes, at a temperature of 125° C.

The coating composition may comprises further ingredients commonly used in coating compositions such as white and color pigments, extender pigments, and one or more additives such as for example UV stabilizers, dispersants, surfactants, anti-static agents, flame-retardant agents, lubricants, anti-foaming agents, plasticizers, anti-freezing agents, waxes, thickeners, leveling agents, and biocides. Pigments and additives may be comprised in any one of components A and B or in both. Pigments are preferably comprised in component A.

It has been found that the coating composition according to the invention is storage stable, i.e. both component A and component B do not gel upon storage. Moreover, it has been found that component B does not develop an unacceptable level of sulfide odor. Upon combining the two components, the coating composition has acceptable pot life to allow application on a substrate. The applied coating composition has been found to result in a hard, scratch resistant coating when allowed to air-dry at ambient conditions. A tack-free coating is obtained in a relatively short time. There is no need to add peroxide or other radical polymerization initiator to the combined components A and B in order to initiate curing or achieve a tack-free coating in a short time.

In a final aspect, the invention relates to a substrate coated with a coating deposited from a coating composition according to the invention. The substrate may be any suitable substrate, such as for example wood, polymer, composite, metal or mineral substrate. The coating composition may be applied on a bare or on a primed substrate. The coating composition may be applied as a primer or as a topcoat, preferably as a topcoat. One or more layers of the coating composition may be applied. If the coating composition is used as a primer, it preferably comprises typical primer components such as fillers. Preferably, the coating composition is applied as a topcoat.

EXAMPLES

The invention is further illustrated by means of the following non-limiting examples.

Preparation of Components A and B

Alkyd Resin Solution 1

A solution of 80 wt % alkyd resin in xylene was prepared as follows. A mixture of fatty acids derived from soybean oil, phthalic anhydride (300 parts by weight), benzoic acid (338 parts by weight), maleic anhydride (7 parts by weight) and pentaerythritol (308 parts by weight) were reacted in xylene at 230° C. until an acid value below 10 mg KOH/g was obtained. The resulting alkyd had an oil length of 35%, a number average molecular weight of 2,663 g/mol, a weight average molecular weight of 19,267 g/mol, and a viscosity of 84 Pa·s (determined with a cone and plate viscometer at 23° C. and a shear rate of 100 $s^{-1}$).

Alkyd Resin Solution 2

A solution of 80 wt % alkyd resin in xylene was prepared as follows. A mixture of fatty acids derived from linseed oil, phthalic anhydride (291 parts by weight), benzoic acid (343 parts by weight), maleic anhydride (7 parts by weight) and pentaerythritol (305 parts by weight) were reacted in xylene at 230° C. until an acid value below 12 mg KOH/g was obtained. The resulting alkyd had an oil length of 35%, a number average molecular weight of 2,347 g/mol, a weight average molecular weight of 18,314 g/mol, and a viscosity of 51 Pa·s (determined with a cone and plate viscometer at 23° C. and a shear rate of 100 $s^{-1}$).

The following driers and anti-skinning agents were used:

| | |
|---|---|
| Mn Nuodex 10 | manganese carboxylate |
| Ligand (9.5 wt % solution) | 1,4,7-trimethyl-1,4,7-triazacyclononane in D60/dipropyleneglycol methyl ether (1.0:0.4) |
| Durham Nuodex Calcium 10 | calcium carboxylate |
| Duroct ® Zirconium 18% | zirconium carboxylate |
| Exkin 2 | methyl ethyl ketoxime |

Four different components A were prepared by adding driers and an anti-skinning agent to a solution of alkyd resin 1 or a solution of alkyd resin 2.

The amounts of the different constituents in components A1 to A4 are given in Table 1 (constituents in wt %).

TABLE 1

Components A1 and A2

| | A1 | A2 | A3 | A4 |
|---|---|---|---|---|
| Alkyd resin 1 (80 wt % solids) | 60.72 | 60.91 | | |
| Alkyd resin 2 (80 wt % solids) | | | 58.52 | 58.72 |
| Butyl acetate | 36.92 | 37.04 | 39.48 | 39.62 |
| Mn Nuodex 10 | 0.10 | 0.10 | 0.10 | 0.10 |
| Durham Nuodex Ca 10 | 0.24 | 0.24 | 0.34 | 0.34 |
| Duroct ® Zirconium 18% | 1.22 | 1.22 | 0.85 | 0.85 |
| Ligand solution | 0.32 | | 0.33 | |
| Exkin 2 | 0.49 | 0.49 | 0.38 | 0.38 |

Different components B were prepared by combining a (meth)acrylate compound and a thiol compound.

TABLE 2

Components B1 to B9

| | B1 | B2 | B3 | B4 | B5 | B6 | B7 | B8 | B9 |
|---|---|---|---|---|---|---|---|---|---|
| trimethylolpropane trimethacrylate | 91 | | | 87 | 95 | | 91 | | 100 |
| trimethylolpropane triacrylate | | 91 | | | | | | | |
| di(trimethylolpropane) tetraacrylate | | | 91 | | | 95 | | | |
| trimethylolpropane tris(3-mercaptopropionate) | 9 | 9 | 9 | | 5 | 5 | | 100 | |
| 1-dodecanethiol | | | | 13 | | | 9 | | |

Test Methods

König Hardness

The König hardness of coating films was assessed using the pendulum damping test according to ISO 1522:2006. A glass panel was coated with a 150 µm wet film, held at 21° C. and 49% relative humidity and the hardness development in time was monitored with a König pendulum. The number of oscillations needed to reduce from an initial deflection of 6° to a deflection of 3° was measured. The average of duplicate measurements was recorded. The König hardness was measured after 1 day, 8 days, 14 days, 4 weeks, 8, weeks and/or 3 months storage at 21° C. and 49% relative humidity.

Tack Free Time

A wet layer of coating composition was applied on a glass panel (10×30 cm) using a K-control coater with a bar applicator (gap size of 150 µm). The coated glass panel was allowed to dry at 22° C. and 44% relative humidity on a table. At regular time intervals after application, a small ball of cotton wool was dropped on the panel from 10-15 cm height. The panel was then immediately lifted at one of its short sides while the other short side still rested on the table and rotated in vertical position (90° angle with the table). If the cotton wool ball sticks to the panel, the coating is not tack free. The time at which the cotton ball drops from the panel is the time when the coating is considered tack-free.

Example 1—Hardness and Tack-Free Time

Coating compositions were prepared by manually mixing a component A and a component B as indicated in Tables 3 and 4 (amounts of components in parts by weight). Coating compositions 2 to 8 in Table 3 and coating compositions 13 to 17 in Table 4 are compositions according to the present disclosure; coating compositions 1 and 9 to 11 in Table 3 and coating compositions 12 and 18 to 20 in Table 4 are comparison compositions (indicated with *). The König hardness and the tack-free time were determined as described above. The results are given in Tables 3 and 4. The results show that the coating compositions according to the present disclosure develop acceptable hardness and have an acceptable tack-free time.

TABLE 3

Coating compositions 1 to 11

| | 1* | 2 | 3 | 4 | 5 | 6 | 7 | 8 | 9* | 10* | 11* |
|---|---|---|---|---|---|---|---|---|---|---|---|
| A1 | 100 | 100 | 100 | 100 | 100 | 100 | 100 | 100 | | 100 | 100 |
| A2 | | | | | | | | | | | 100 |
| B1 | | 11 | 22 | | | | | | | | 11 |
| B2 | | | | 11 | 22 | | | | | | |
| B3 | | | | | | 11 | 22 | | | | |
| B4 | | | | | | | | 11.5 | | | |
| B8 | | | | | | | | | | 1 | |
| B9 | | | | | | | | | | 10 | |
| Viscosity$^a$ (mPa · s) | 83 | 58 | 51 | 62 | 60 | 71 | 73 | | 69 | | |
| König Hardness$^b$ 1 d | 13 | 18 | 23 | 14 | 14 | 13 | 15 | | 14 | | |
| König hardness$^b$ 8 d | 33 | 49 | 67 | 41 | 48 | 44 | 60 | | 36 | | |
| König hardness$^b$ 4 wks | 38 | 54 | 70 | 46 | | 47 | 64 | 45 | 40 | 58 | 85 |
| König hardness$^b$ 8 wks | 52 | 72 | 89 | 64 | | 66 | 81 | 61 | 57 | | |
| König hardness$^b$ 3 m | 63 | 86 | 94 | | | 82 | 97 | 74 | 70 | | |
| Tack-freetime (min) | 30 | 60 | 60 | 60 | 90 | 90 | 90 | 90 | 30 | 240 | >700 |

TABLE 4

Coating compositions 12 to 20

| | 12* | 13 | 14 | 15 | 16 | 17 | 18* | 19* | 20* |
|---|---|---|---|---|---|---|---|---|---|
| A3 | 100 | 100 | 100 | 100 | 100 | 100 | 100 | 100 | |
| A4 | | | | | | | | | 100 |
| B5 | | 11 | 22 | | | | | | 11 |
| B6 | | | | 11 | 22 | | | | |
| B7 | | | | | | 11.5 | | | |
| B8 | | | | | | | 1 | | |
| B9 | | | | | | | | 10 | |
| Viscosity$^a$ (mPa · s) | 64 | 62 | 53 | 70 | 74 | 56 | 65 | 58 | 58 |
| König Hardness$^b$ 1 day | 10 | 18 | 30 | 11 | 9 | 16 | 10 | 13 | 24 |
| König Hardness$^b$ 8 days | 36 | 44 | 70 | 51 | 48 | 42 | 34 | 28 | 76 |
| König Hardness$^b$ 14 days | 37 | 80 | 102 | 73 | 74 | 68 | 40 | 38 | 91 |
| Tack-free time (min) | 20 | 38 | 53 | 65 | 106 | 42 | 23 | 72 | 255 |

$^a$determined at 23° C. and a shear rate of 10,000 s$^{-1}$ using a rotary viscometer
$^b$number of oscillations needed to reduce from an initial deflection of 6° to a deflection of 3°

Example 2—Storage Stability

Different two-component coating compositions were prepared, all with comparable overall composition (if the respective components A and B were combined in a weight ratio of 2:1). Composition 21 is a composition according to the present disclosure. Compositions 22 to 25 are comparison compositions.

The storage stability of components A and B was determined by storing the components at 50° C. and visually and olfactory inspecting the components after 4 weeks.

The constituents (in wt %) and the storage stability of the different components A and B for each of coating compositions 21 to 25 is given in Table 4. Components A23 and A24 gelled. Component A24, moreover, developed a strong sulfide odor. Components A21, A22 and A25 were storage stable (no gelling occurred; no sulfide odor developed). Components B22 and B25 gelled. Components B21, B23 and B24 were storage stable (no gelling occurred; no sulfide odor developed).

Coating composition 21 (according to the present disclosure) is the only coating composition for which the two components could be combined to form a coating composition (no gelling of any of the components).

TABLE 4

Coating compositions 21 to 25: constituents (wt %) and storage stability

| | Coating composition | | | | |
|---|---|---|---|---|---|
| | 21 | 22* | 23* | 24* | 25* |
| Component A | A21 | A22 | A23 | A24 | A25 |
| alkyd resin 2 (80 wt % solids) | 62.3 | 61.7 | 61.6 | 62.0 | 62.1 |
| butyl acrylate | 2.7 | 2.7 | 2.7 | 2.7 | 2.7 |
| ester solvent | 19.6 | 19.4 | 19.4 | 19.5 | 19.5 |
| Additives | 0.7 | 0.7 | 0.7 | 0.7 | 0.7 |
| miconized polypropylene wax | 12.3 | 12.1 | 12.1 | 12.2 | 12.2 |
| Mn Nuodex 10 | 0.1 | | 0.1 | 0.1 | |
| Durham Nuodex Ca 10 | 0.4 | 0.4 | 0.4 | 0.4 | 0.4 |
| Duroct Zirconium 18% | 0.9 | 0.9 | 0.9 | 0.9 | 0.9 |
| ligand solution | 0.7 | 0.7 | 0.7 | | |
| Exkin 2 | 0.1 | 0.1 | 0.1 | 0.1 | 0.1 |
| thiol compound$^c$ | | 1.2 | 1.2 | 1.2 | 1.2 |
| Storage stability | | gelled | | | gelled, sulfide odor |
| Component B | B21 | B22 | B23 | B24 | B25 |
| (meth)acrylate compound$^d$ | 45.3 | 46.4 | 46.5 | 45.8 | 45.7 |
| thiol compound$^c$ | 2.4 | | | | |
| Mn Nuodex 10 | | 0.2 | | | 0.2 |
| ligand solution | | | | 1.4 | 1.4 |
| butyl acrylate | 52.2 | 53.4 | 53.5 | 52.8 | 52.7 |
| Storage stability | | gelled | | | gelled |

$^c$pentaerythritol tetrakis(3-mercaptopropionate)
$^d$trimethylolpropanetrimethacrylate

The invention claimed is:

1. A two-component solvent-based coating composition comprising:
    a component A comprising an autoxidizable resin comprising unsaturated fatty acids and a metal-ligand complex as drying catalyst, wherein the metal is manganese, vanadium or iron; and
    a component B comprising a (meth)acrylate compound and a thiol compound, wherein the (meth)acrylate compound is a poly (meth)acryloyl functional ester of (meth)acrylic acid and a polyhydric alcohol or a poly (meth)acryloyl functional dimer of such ester;
    wherein component B is free of drying catalyst;
    wherein component A is free of a compound comprising a thiol group and of a compound comprising a (meth) acryloyl functional group;
    wherein the coating composition is free of cobalt; and
    wherein the molar ratio of thiol groups in the thiol compound to ethylenically unsaturated groups in the (meth)acrylate compound is in the range of from 0.01 to 0.10.

2. The two-component solvent-based coating composition according to claim 1, wherein the coating composition comprises in the range of 15 to 40 wt % of the (meth)acrylate compound based on the total weight of the autoxidizable resin and the meth)acrylate compound.

3. The two-component solvent-based coating composition according to claim 1, wherein the coating composition has a solids content in the range of from 55 to 75 wt %.

4. The two-component solvent-based coating composition according to claim 1, wherein the (meth)acrylate compound is a di-, tri-, or tetra-(meth)acryloyl functional compound.

5. The two-component solvent-based coating composition according to claim 1, wherein the (meth)acrylate compound is a methacrylate compound.

6. The two-component solvent-based coating composition according to claim 1, wherein the fatty acids comprised in the autoxidizable resin have an iodine value in the range of from 135 to 180.

7. The two-component solvent-based coating composition according to claim 1, wherein the autoxidizable resin is an alkyd resin.

8. The two-component solvent-based coating composition according to claim 7, wherein the alkyd resin has a weight average molecular weight in the range of from 10,000 to 30,000 g/mol.

9. The two-component solvent-based coating composition according to claim 7, wherein the alkyd resin has a number average molecular weight in the range of from 1,500 to 3,500 g/mol.

10. The two-component solvent-based coating composition according to claim 7, wherein the alkyd resin has an oil length in the range of from 20 to 40%.

11. The two-component solvent-based coating composition according to claim 1, wherein the drying catalyst is an iron-ligand complex or a manganese-ligand complex.

12. The two-component solvent-based coating composition according to claim 1, wherein the thiol compound is an alkanethiol comprising 10 to 20 carbon atoms or an ester of thioglycolic acid, 2-mercapto propionic acid or 3-mercapto propionic acid with glycol, pentaerythritol, dipentaerythritol or trimethylolpropane.

13. The two-component solvent-based coating composition according to claim 12, wherein the thiol compound is a tri- or tetra functional thiol compound.

14. A substrate coated with a coating deposited from the two-component solvent-based coating composition according to claim 1.

* * * * *